United States Patent [19]

Boev et al.

[11] 4,443,748
[45] Apr. 17, 1984

[54] METHOD OF CONTROLLING SPEED OF AT LEAST ONE INDUCTION MOTOR AND DEVICE THEREFOR

[76] Inventors: Vladimir S. Boev, Kashirskoe shosse, 128, Kv. 131; Sergei P. Golev, ulitsa Novinki, 4, kv. 68; Viktor I. Dmitriev, ulitsa Vysokaya, 13, kv. 10; Efim M. Pevzner, ulitsa Generala Belova, 53 korpus 2, kv. 182; Andrei G. Yaure, ulitsa Kuusiren, 9, kv. 114; Lev B. Masandilov, 2 Yuzhno-portovy proezd, 13, kv. 57, all of Moscow, U.S.S.R.

[21] Appl. No.: 244,138

[22] Filed: Mar. 16, 1981

[51] Int. Cl.³ .............................................. H02P 7/40
[52] U.S. Cl. ..................................... 318/732; 318/821
[58] Field of Search ............... 318/865, 759, 760, 761, 318/731, 732, 821–823

[56] References Cited

U.S. PATENT DOCUMENTS

| | | | |
|---|---|---|---|
| 3,348,110 | 10/1967 | Koppelmann | 318/760 |
| 3,439,245 | 4/1965 | Perdue | 318/828 |
| 3,657,622 | 4/1972 | Reuland et al. | 318/823 |
| 3,969,659 | 7/1976 | Thode | 318/823 |
| 4,140,951 | 2/1979 | Greenhough | 318/822 |
| 4,311,950 | 1/1982 | Goldin et al. | 318/716 |

OTHER PUBLICATIONS

P. E. Danilov, "Induction Power Drive Incorporating Means for Adjusting Rectified Current by Pulse Method", Moscow, Energy publishers, 1977, pp. 58–64.

Primary Examiner—David Smith, Jr.
Attorney, Agent, or Firm—Lilling & Greenspan

[57] ABSTRACT

A method of controlling the speed of an induction motor comprises the steps of feeding a supply voltage to the winding of a motor stator and obtaining a signal proportional to the motor speed by varying the voltage across the winding of a motor rotor before activating switch thyristors in the rotor circuit. When the obtained signal exceeds a predetermined value, a signal enabling the switch thyristors will be shaped using the same signal. After one of the thyristors is activated, the level of the voltage measured across the rotor winding is reduced to zero or to a value below a predetermined value, thereby causing the signal to cease. Then the entire process is repeated for each of the subsequent thyristors. The speed of several motors may be controlled. A device for accomplishing the hereinproposed method comprises a unit for effecting sampled-data control of a motor speed, said unit being connected through a pulse distributor to the control input of a thyristor switch which is, in turn, connected to the winding of the motor rotor. The unit for effecting sampled-data control of the speed of the motor rotor contains an element having an adjustable operating threshold and a pulse shaper connected to the pulse distributor, said element and said pulse distributor being placed in series. The input of the element having an adjustable operating threshold is electrically coupled to the output of the thyristor switch.

4 Claims, 8 Drawing Figures

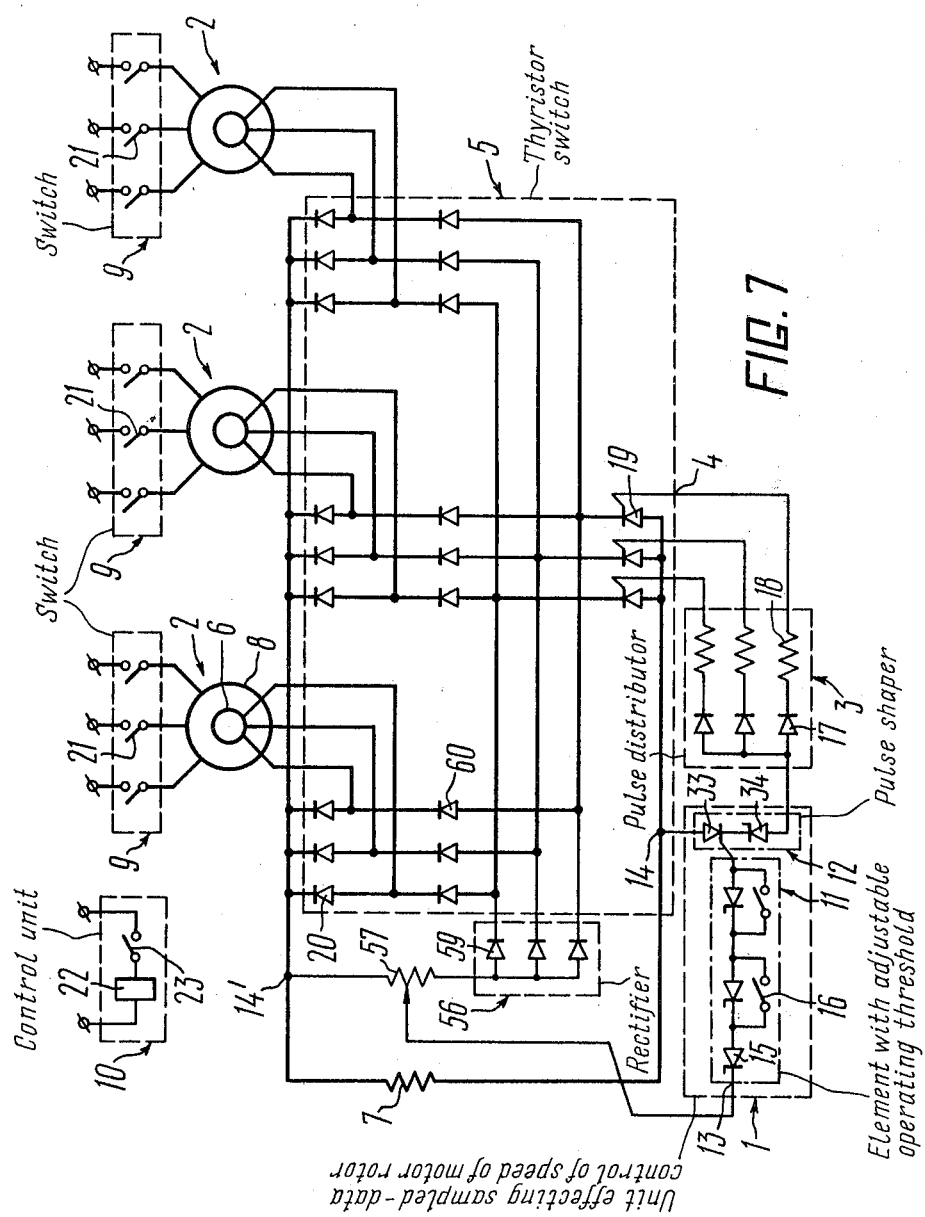

METHOD OF CONTROLLING SPEED OF AT LEAST ONE INDUCTION MOTOR AND DEVICE THEREFOR

FIELD OF THE INVENTION

The present invention relates to methods of controlling the speed of motors and systems therefore and in particular to methods of controlling the speed of at least one induction motor and devices therefor.

The invention may be used in mechanisms with active and passive static loads, for example, in drives of crane mechanisms for controlling the load transfer and lifting speeds.

DESCRIPTION OF THE PRIOR ART

Known in the art is a method of controlling the speed of an induction motor, wherein on application of voltage to the stator winding of the motor a signal from the rotor winding of the motor is continuously fed to activate switch thyristors, the magnitude of the signal being varied depending on the motor speed (cf. U.S. Pat. No. 3,810,253, May 7, 1974).

Also known in the art is a device for controlling the speed of an induction motor, which is used to execute the foregoing method and contains a thyristor switch in the rotor winding circuit of the motor, a switch control unit representing a variable resistor or a magnetic element or an electronic photocell or a tunnel diode and connected via its input to the rotor winding through a rectifier and via its output to the control electrodes of the switch thyristors (cf. U.S. Pat. No. 3,810,253).

The use of such a switch control unit in said device for accomplishing the afore-mentioned method does not allow obtaining a wide speed control range (1:4, max.) since, with a changing static moment of resistance on the motor shaft, it is necessary to vary current in the rotor winding circuit, which is done by adjusting the control angle of the switch thyristors as required. However, this variation is possible only when the motor speed is increased or decreased whereby the corresponding mechanical characteristics will be too soft.

Another known method of controlling the speed of at least one induction motor and a device therefor permit obtaining a wider motor speed control range (1:10, max.) (cf. P. E. Danilov "Induction Power Drive Incorporating Means for Adjusting Rectified Current by Pulse Method", Moscow, "Energy" publishers, 1977, pp 58–64 in Russian).

The aforesaid method comprises the steps of feeding supply voltage to the stator winding of the motor, obtaining a signal proportional to the motor speed, comparing it with a predetermined value and shaping a signal to activate the switch thyristors.

With such a method the signal proportional to the motor speed is obtained by adding up the measured voltage and current in the rotor winding circuit. The obtained signal proportional to the speed is compared with a speed setting signal and an additional signal is shaped to activate the switch thyristors, said additional signal having a frequency proportional to the value of the compared signals.

A disadvantage of the known method is that considerable difficulties are involved in controlling a motor speed since separation of a signal proportional to the motor speed calls both for voltage measurement and separation of a current signal across the rotor winding. The above magnitudes are measured continuously irrespective of the state of the switch, which results in fluctuations of the measured quantities due to a changing thyristor switching rate, a limitation necessitating separation of the fundamental harmonic of a signal proportional to the motor speed. Furthermore, a difference between the setting signal and the signal proportional to the speed has to be increased and an additional signal should be shaped to activate the thyristors.

A device for controlling the speed of at least one induction motor to accomplish the foregoing method comprises a unit effecting sampled-data control of the speed of a motor rotor, which is connected through a pulse distributor to the control input of a thyristor switch connected, in turn, to the rotor winding of the motor electrically coupled to at least one resistor, the stator winding of the motor being connected to a power supply through a switch coupled to a main control unit.

The aforesaid device for accomplishing said method also comprises a motor-speed setting unit and a motor-speed transducer incorporating means for measuring, respectively, voltage and current across the rotor winding of the motor and an adder whose inputs are connected to the outputs of the measuring means.

In the device for accomplishing said method the unit effecting sampled-data control of the rotor speed contains a series-connected adder, an amplifier, and a pulse shaper. The pulse shaper includes a pulse generator connected to a gate which is, in turn, connected to a synchronizing unit coupled to the rotor winding of the motor.

The output of the adder of the speed transducer is connected to the input of the adder of the sampled-data control unit whose other input is coupled to the speed setting unit.

The use of such a unit effecting sampled-data control of the motor speed and the presence of the motor-speed transducer and the motor-speed setting unit in the circuitry of the foregoing device substantially complicate its construction, a disadvantage attributed to the utilization of a plurality of electronic components having unstable characteristics dependent upon temperature, humidity and other environmental conditions.

The presence of a large number of electronic components appreciably decreases reliability of the device and degrades other operational characteristics thereof, a factor frequently causing its failure even under normal operating conditions. Moreover, considerable difficulties are involved in restoring normal functioning of the device.

The use of two signals for measuring the motor speed (rotor voltage and current signals), dependence of the measured magnitudes on a static loading moment and instability of the parameters of the electronic components are factors limiting the motor-speed control range (1:10, max.) even though the voltage furnished by a power supply is stable. The fact that the motor speed is directly proportional to variations of voltage fed from the power supply further limits the motor-speed control range.

The impossibility of deceleration confines the operation of the motor only to the first and third quadrants of mechanical characteristics, a disadvantage preventing the utilization of said device in many mechanisms with active static loads.

SUMMARY OF THE INVENTION

It is an object of the present invention to provide a simple method of controlling the speed of at least one induction motor.

Another object of the invention is to provide a constructionally simple device for controlling the speed of at least one induction motor, which is capable of accomplishing the method in compliance with the invention.

Still another object of the invention is to provide a device for controlling the speed of at least one induction motor, which accomplishes the hereinproposed method and allows obtaining a wide motor-speed control range (1:20, min).

A further object of the invention is to provide a device for controlling the speed of at least one induction motor, which accomplishes the hereinproposed method and ensures a condition under which a control range is independent of variations of voltage fed from a power supply.

One more object of the invention is to provide a device for controlling the speed of at least one induction motor, which accomplishes the hereinproposed method and assures deceleration of a motor and, in effect, its operation with all four quadrants of mechanical characteristics.

The foregoing objects are accomplished by a method of controlling the speed of at least one induction motor comprising the steps of feeding supply voltage to the winding of a motor stator, obtaining a signal proportional to the motor speed, comparing it with a predetermined value and shaping a signal to activate switch thyristors in a rotor circuit. According to the invention, the signal proportional to the motor speed is obtained by measuring voltage across the winding of a motor rotor before activating the switch thyristors. When the obtained signal exceeds a predetermined value, the signal activating the switch thyristors is shaped using the same signal. After activation of one of the thyristors, the level of the voltage measured across the rotor winding is reduced to zero or to a value below a predetermined value, thereby causing the signal to cease. After the turn-off of said thyristor, the signal proportional to the motor speed is obtained again by measuring the voltage across the winding of the motor rotor. When the repeatedly obtained signal exceeds a predetermlined value, the signal activating each of the subsequent switch thyristors is obtained using the same signal.

The foregoing objects are also attained by a device for controlling the speed of at least one induction motor accomplishing the hereinproposed method and comprising a unit effecting sampled-data control of the speed of a motor rotor connected through a pulse distributor to the control input of a thyristor switch which is, in turn, connected to the rotor winding of the motor electrically coupled to at least one resistor, the stator winding of the motor being connected to a power supply through a switch coupled to a main control unit. According to the the invention, the unit effecting sampled-data control of the speed of the motor rotor contains an element having an adjustable operating threshold and a pulse shaper connected to the pulse distributor, said element and said shaper being placed in series, the input of the element with an adjustable operating threshold being electrically coupled to the output of the thyristor switch.

Preferably the device forming the subject of the present invention contains a load setter for the motor. An OR gate has one input connected to the first output of the load setter for the motor, which is also coupled to the input of the main control unit, while the other input thereof is connected to the second output of the load setter for the motor, the output of said gate being coupled to the control input of the element having an adjustable operating threshold and comprised in the unit effecting sampled-data control. The device is also preferably provided with a switch effecting dynamic braking of the motor, the input of which is connected to the outputs of the thyristor switch and whose output is connected to the stator winding of the motor. An additional control unit has an input coupled to the second output of the load setter for the motor and whose output is coupled to the other input of the switch effecting dynamic braking of the motor.

It is also advantageous that the device in compliance with the invention should additionally incorporate a power-supply voltage generator; a relay element having one input connected to the first output of the load setter for the motor and the other input connected to the output of the voltage generator; and a comparison unit having one input connected to the output of the relay element, another input electrically coupled to the outputs of the thyristor switch and an output connected to the pulse shaper of the sampled-data control unit.

The device according to the invention may include a rectifier connected to the rotor winding of the motor and a voltage divider coupled to the rectifier and to the output of the thyristor switch and connected via its output to the input of the element having an adjustable operating threshold and comprised in the sampled-data control unit.

Such a structural arrangement of the device for accomplishing the hereinproposed method allows substantially reducing its dimensions and operational cost in installation, alignment, maintenance and repair, another advantage being enhanced efficiency of mechanisms mounting said device due to a wider speed control range.

Furthermore, the device in compliance with the invention has a wider application range due to its operation with all four quadrants of mechanical characteristics.

BRIEF DESCRIPTION OF THE DRAWINGS

The foregoing and other objects of the invention will become apparent from the description of a specific embodiment thereof, taken in conjunction with the accompanying drawings, wherein:

FIG. 7 is an electrical schematic diagram of the device of FIG. 5 with several motors, according to the invention.

DETAILED DESCRIPTION OF THE INVENTION

Figure 1:
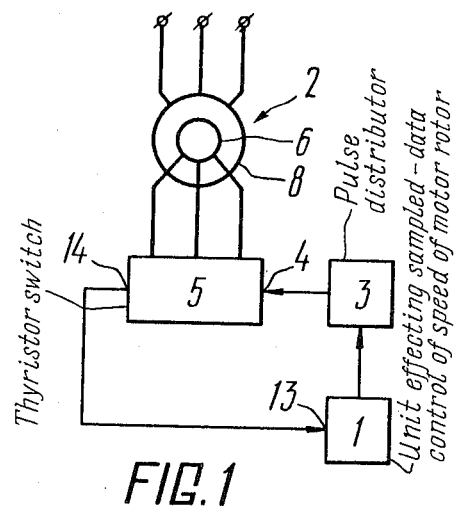
FIG. 1 is a block diagram of a device for accomplishing a method according to the invention.

The method of controlling the speed of an induction motor, forming the subject of the present invention, comprises the steps of feeding supply voltage to the winding of a motor stator, obtaining a signal proportional to the motor speed by measuring voltage across the winding of a motor rotor before activating switch thyristors in a rotor circuit, and shaping a signal to activate the thyristors of the switch. When the obtained signal exceeds a predetermined value, the signal activating the switch thyristors is shaped using the same signal. After one of the switch thyristors is activated, the level of the voltage measured across the rotor winding is reduced to zero, thereby causing the signal to cease. Then, after the turn-off of said thyristor, the signal proportional to the motor speed is obtained again by measuring the voltage across the winding of the motor rotor. When the repeatedly obtained signal exceeds a predetermined value, the signal activating each of the subsequent switch thyristors is obtained using the same signal. The afore-described procedure constitutes a first embodiment of the hereinproposed method.

In a second embodiment of the invention, the motor-speed control range and quality are increased by decreasing the level of the voltage measured across the winding of the motor rotor to a value below a predetermined value after activating one of the switch thyristors. As a result, the signal will cease. Apart from the above peculiarity, the second embodiment of the hereinproposed method is similar to the first embodiment.

The afore-mentioned embodiments of the method are good for controlling the speed of only one induction motor. However, the hereinproposed method is suitable for any number of motors.

A device for controlling the speed of an induction motor, effecting the first embodiment of the method in compliance with the invention, comprises a unit 1 (FIG. 1), effecting sampled-data control of the rotor of a motor 2, connected through a pulse distributor 3 to a control input 4 of a thyristor switch 5 which is, in turn, connected to a winding 6 of the rotor of the motor 2.

The winding 6 (FIG. 2) is electrically coupled to a resistor 7 through the thyristor switch 5.

A winding 8 of the stator of the motor 2 is connected to a power supply (representing terminals in the drawing for convenience) through a switch 9 coupled to a control unit 10. Magnetic coupling is used in the preferred embodiment of the invention.

The unit 1, effecting sampled-data control of the speed of the rotor of the motor 2, comprises an element 11 having an adjustable operating threshold and a pulse shaper 12 connected to the pulse distributor 3, said element and said shaper being placed in series. An input 13 of the element 11 is electrically coupled to an output 14 of the thyristor switch 5. The input 13 of the element 11 acts as the input 13 (FIG. 1) of the unit 1.

In the preferred embodiment of the device the element 11 (FIG. 2) having an adjustable operating threshold incorporates three voltage reference diodes 15 to suit the number of control stages; switches 16 are placed in parallel with two of said voltage reference diodes.

In the preferred embodiment of the invention the pulse shaper 12 is a diode thyristor.

The pulse distributor 3 includes three diodes 17 to suit the number of phases of the rotor winding 6; and, the diodes 17 are placed in series with three resistors 18.

The anodes of the diodes 17 are combined and connected to the pulse shaper 12. The cathodes of the diodes 17 are connected through the resistors 18 to the control electrodes of thyristors 19 of the switch 5. The thyristor switch 5 comprises three thyristors 19, to suit the number of phases of the rotor winding 6 of the motor 2, and three diodes 20 connected as a three-phase semicontrollable bridge. The control electrodes of the thyristors 19 act as the control input 4 of the switch 5.

The input of the thyristor 5 is connected to the rotor winding 6, while its output is connected to the resistor 7.

The switch assembly 9 is composed of three switches 21 to suit the number of phases of the stator winding 8, and these switches are connected to the stator winding 8 and to the power supply. To control reversible mechanisms, the switch assembly represents a reversible structure (not shown in the drawing).

The control unit 10 contains such series-connected components as a coil 22 and a switch 23 inserted in the control circuit (representing terminals in the drawing for convenience). The coil 22 is magnetically coupled to the switches 21.

The afore-mentioned embodiment of the device for accomplishing the hereinproposed method, being as simple as it is, is particularly suitable for mechanisms with a control range of 1:20, which do not call for speed control under deceleration conditions.

Figure 3:
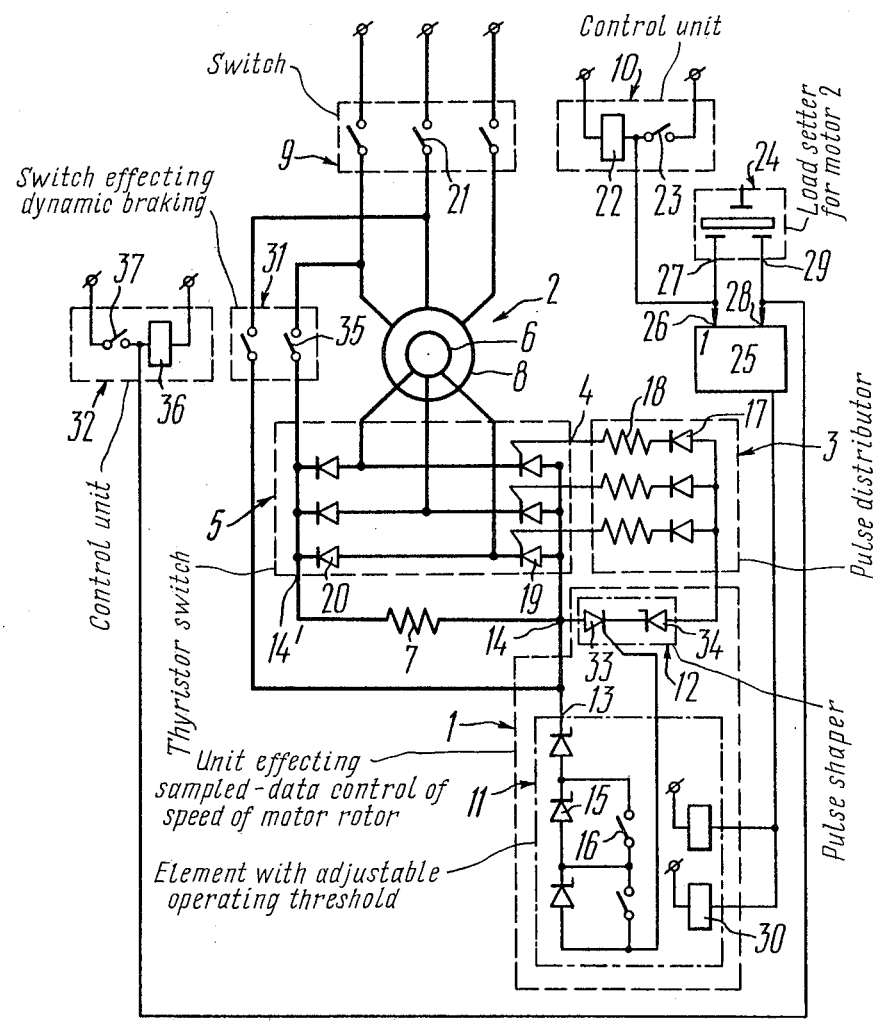
FIG. 3 is an electrical schematic diagram of another embodiment of the device, according to the invention.

In another embodiment of the device illustrated in FIG. 3 which is used to effect the first embodiment of the hereinproposed method, there are additionally provided a load setter 24 for the motor 2; and an OR gate 25 having an input 26 connected to an output 27 of the setter 24 and which is also coupled to the input of the control unit 10. An input 28 of the OR gate 25 is connected to an output 29 of the load setter for the motor 2. The output of the OR gate 25 is connected to coils 30 of the element 11 with an adjustable operating threshold, which are magnetically coupled to the switches 16 and serves as the control input of the element 11.

The device of FIG. 3 also includes a switch 31 effecting dynamic braking of the motor 2, the input of which is connected to the outputs 14 and 14$^1$ of the thyristor switch 5 and whose output is coupled to two phases of the stator winding 8 of the motor 2; and a control unit 32 having its input connected to the output 29 of the load setter 24 for the motor 2 and its output magnetically coupled to the input of the switch 31.

In the preferred embodiment of the device the load setter 24 is a spring-loaded transducer of a load limiter installed on the mechanism with which it is used. The pulse shaper 12 is made up of a thyristor 33 and a voltage reference diode 34, which are placed in series. The anode of the thyristor 33 is connected to the output 14 of the switch 5, and its control electrode is connected to the output of the element 11 having an adjustable operating threshold. The anode of the voltage reference diode 34 is connected to the combined anodes of the diodes 17 of the distributor 3. The cathodes of the thyristor 33 and the voltage reference diode 34 are interconnected.

The switch assembly 31 consists of two switches 35.

The control unit 32 incorporates such series-connected components as a coil 36 and a switch 37 inserted in the control circuit (representing terminals in the drawing for convenience).

The foregoing embodiment of the device accomplishing the hereinproposed method is particularly suitable for mechanisms with a control range of up to 1:20 in controlling the speed with all four quadrants of mechanical characteristics.

Figure 4:
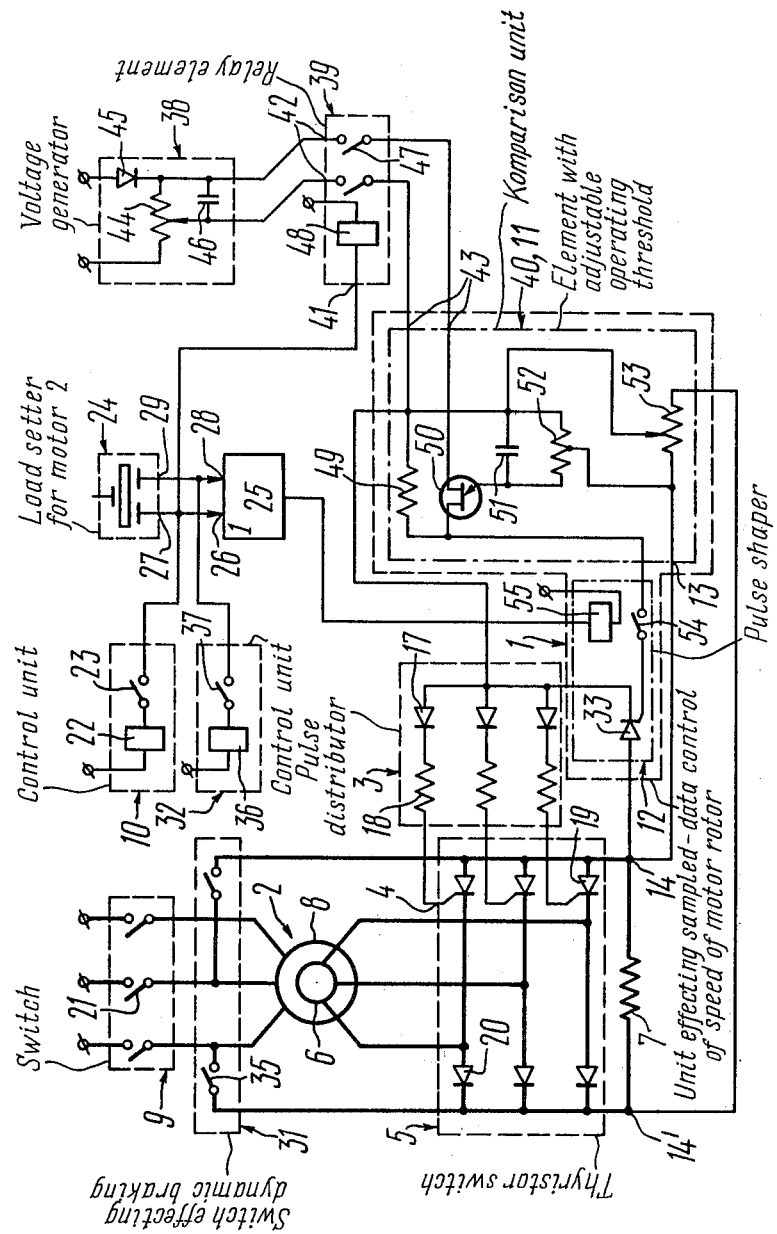
FIG. 4 is an electrical schematic diagram of one more embodiment of the device, according to the invention.

The device of FIG. 4 differs from the device of FIG. 3 in that it additionally includes, according to the invention, a power-supply voltage generator 38 (FIG. 4), a relay element 39 and a comparison unit 40 which, in this preferrred embodiment of the invention, also acts as the element 11 having an adjustable operating threshold.

An input 41 of the relay element 39 is connected to the output 27 of the load setter 24 for the motor 2, an input 42 thereof is coupled to the output of the transducer 38, and the output of said relay element is connected to an input 43 of the comparison unit 40.

The power-supply voltage transducer 38 incorporates such series-connected components as a voltage divider 44 and a diode 45, which are connected to the power supply. Connected to the center tap of the divider 44 and to the cathode of the diode 45 is a capacitor 45 whose terminals act as the input 42 of the relay element 39.

The relay element 39 is a switch 47 magnetically coupled to a coil 48.

The comparison unit 40 is made up of a resistor 49 and a base of a unijunction transistor 50 coupled to one of its leads. A capacitor 51 and a resistor 52 are connected to the emitter of the transistor 50 and to the other lead of the resistor 49. The center tap of the resistor 52 is connected to a potentiometer 53. One extreme lead of the potentiometer 53 serves as the input 13 of the element 11 having an adjustable operating threshold and is electrically coupled to the output 14 of the thyristor switch 5. The other extreme lead of the potentiometer 53 is connected to the output $14^1$ of the thyristor 5. The center tap of the potentiometer 53 is connected to the common point of the capacitor 51 and the resistor 52. One of the bases of the transistor 50 and one of the leads of the resistor 49 serve as the input 43 of the comparison unit 40. The other base of the transistor 50 acts as the input of the pulse shaper 12 which, in the preferred embodiment of the invention, comprises the thyristor 33 and a swich 54, which are placed in series. Magnetically coupled to the switch 54 is a coil 55 connected to the output of the OR gate 25.

The afore-mentioned embodiment of the device accomplishing the hereinproposed method is particularly suitable for mechanisms wherein motor-speed stability has to be independent of variations of voltage fed from the power supply.

Figure 5:
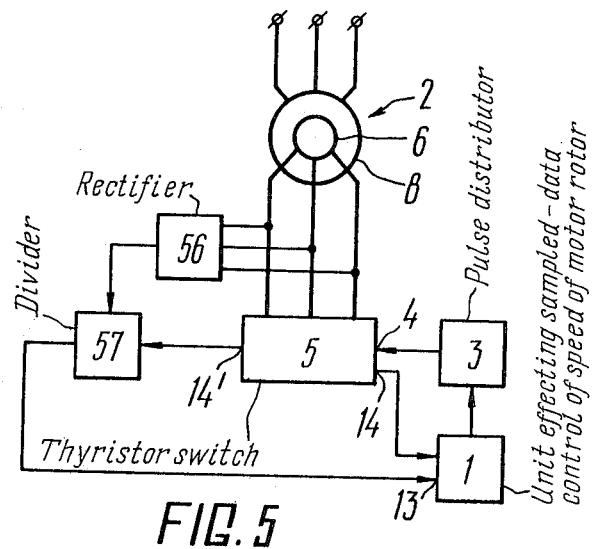
FIG. 5 is a block diagram of a still another embodiment of the device for accomplishing the method, according to the invention.

FIG. 5 illustrates an embodiment of the device for executing the second embodiment of the hereinproposed method.

This device differs from the device of FIG. 1 in that it incorporates a rectifier 56 (FIG. 5) connected to the rotor winding 6 of the motor 2 and a voltage divider 57 coupled to the rectifier 56 and to the output $14^1$ of the thyristor switch 5 and connected via its center tap to the input 13 of the sampled-data control unit 1.

Figure 2:
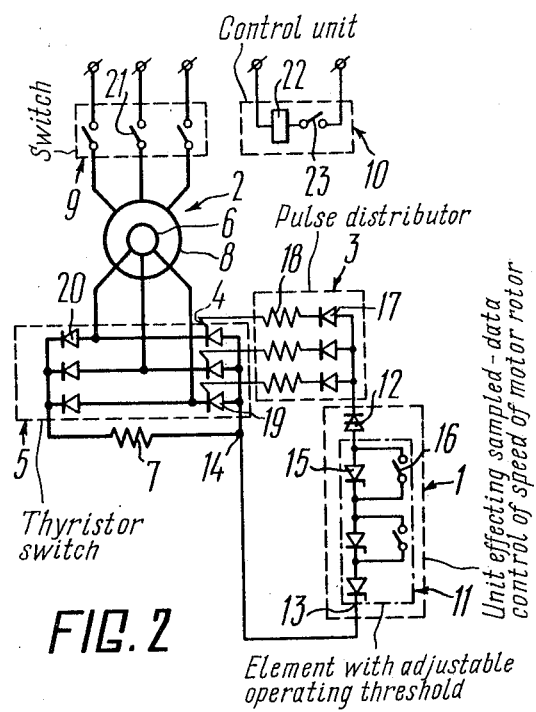
FIG. 2 is an electrical schematic diagram of the device of FIG. 1.
Figure 6:
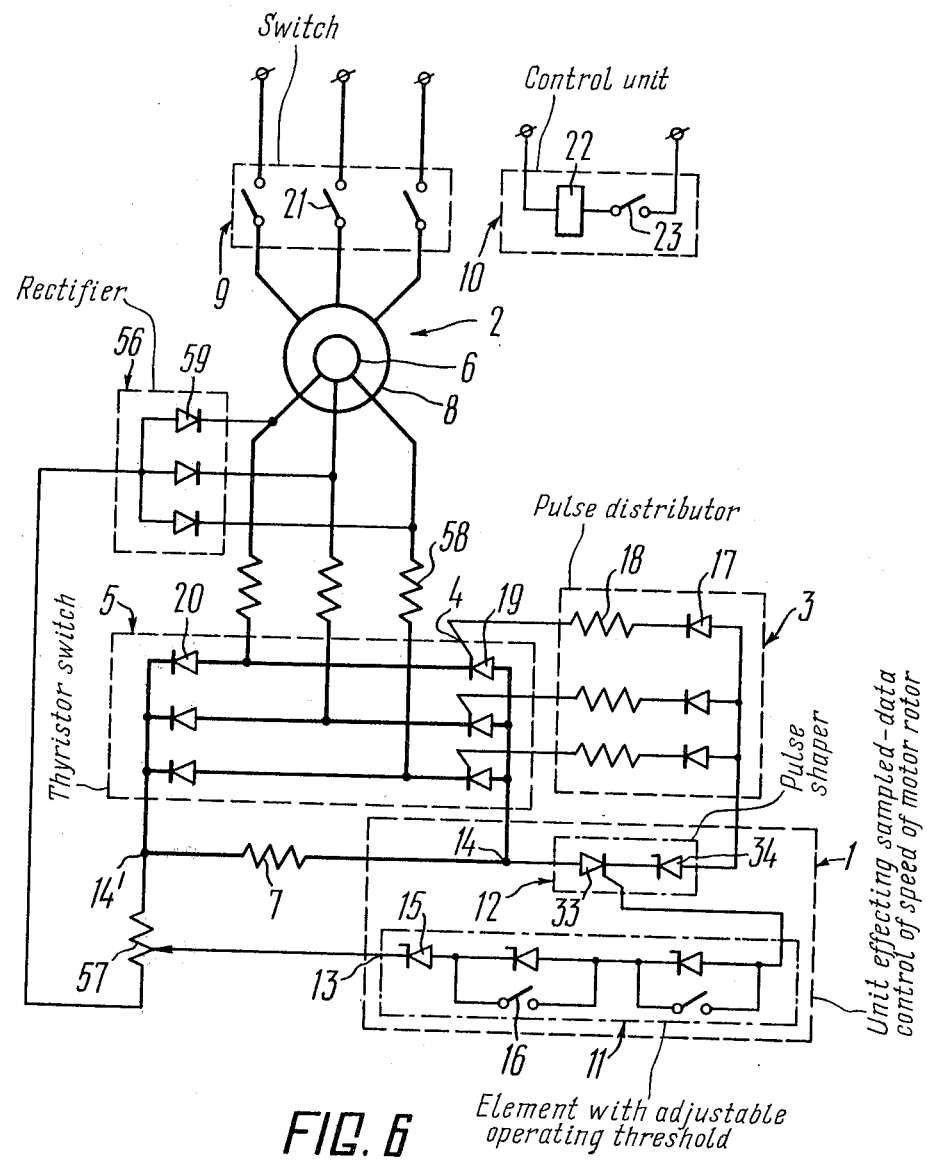
FIG. 6 is an electrical schematic diagram of the device of FIG. 5.

FIG. 6 is a schematic diagram of the preferred embodiment of the device, which is essentially similar to the schematic diagram of the device shown in FIG. 2.

The device of FIG. 6 is different in that the rotor winding 6 of the motor 2 is electrically coupled to the thyristor switch 5 through three resistors 58 to suit the number of the phases of the rotor winding 6. The pulse shaper 12 is essentially similar to that used in the device of FIG. 3.

The rectifier 56 (FIG. 6) incorporates three diodes 59 to suit the number of the phases of the rotor winding 6, and these diodes are connected via cathodes thereof to the rotor winding 6. The anodes of the diodes 59 and interconnected at a common point coupled to one lead of the voltage divider 57. The other lead of the divider 57 is connected to the output $14^1$ of the switch 5. The center tap of the divider 57 is connected to the input 13 of the element 11 of the unit 1.

The afore-mentioned embodiment of the device accomplished the hereinproposed method is particularly suitable for mechanisms whose motor-speed control range has to be greater than 1:20. As simple as it is, the preferred embodiment of the device permits decreasing the direct current component of the rotor, other advantages being increased torque and efficiency of the motor and enhanced control accuracy due to a lesser speed variation during a control procedure.

The device of FIG. 7 in compliance with the invention is also used to accomplish the second embodiment of the hereinproposed method.

Said device is essentially similar to the device of FIG. 6.

The preferred embodiment of the device differs in that it includes means for controlling the speed of several, for example three, motors 2.

In this case the thyristor switch 5 (FIG. 7) includes three sets of the diodes 20 to suit the number of the motors 2, and these diodes are connected via their anodes to the rotor windings 6 of the motors 2. The cathodes of the diodes 20 are interconnected at a common point coupled to one lead of the resistor 7. Three groups of diodes 60 are connected via cathodes thereof to the windings 6 of the motors 2. The anodes of the diodes 60 of respective phases are interconnected and coupled to the cathodes of the thyristors 19. The anodes of the thyristors 19 interconnected at a common point are coupled to the other lead of the resistor 7.

The principle of operation of the device for accomplishing the method in compliance with the invention is as follows.

The switch 9 (FIG. 2) is used to connect the stator winding 8 of the motor 2 to the power supply. An e.m.f. proportional to the slippage of the motor 2 is set up in the rotor winding 6. At the initial moment the e.m.f. of the rotor is maximum with the rotor being stationary and the slippage of the motor 2 equalling unity. The rectified rotor voltage is fed to the input of the element 11 having and adjustable operating threshold. In this case the following inequality will be satisfied:

$$k \cdot E \cdot S > (U_1 + U_2), \quad (1)$$

where
k=rectification factor;
E=e.m.f. of the stationary rotor;
S=slippage of the motor 2;
$U_1$=breakdown voltage of the voltage reference diode 15; and
$U_2$=breakdown voltage of the diode thyristor (pulse shaper 12).

The voltage reference diode 15 and the diode thyristor are broken down and a control signal is fed to the pulse distributor 3 and then to the control electrode of that thyristor 19 of the switch 5 which has a positive anode voltage at the given moment. The thyristor 19 is activated and the rotor current is short-circuited through the resistor 7. The sequence of activation of the thyristors 19 is determined by the magnitude and polarity of their anode voltage. The motor 2 develops torque conditioned by the resistance of the resistor 7. As the motor 2 picks up speed, the e.m.f. of the rotor 6 decreases. When its value becomes smaller than the breakdown voltage of the voltage reference diodes 15 and the diode thyristor, the latter are turned off, thereby rendering the thyristors 19 of the switch 5 nonconductive. The rotor circuit of the motor 2 is deenergized and, due to the static moment of resistance, the motor 2 is decelerated until the rotor e.m.f. becomes greater than or equal to the breakdown voltage of the voltage reference diodes 15 and the diode thyristor. Thereafter the process repeats.

Thus, the motor 2 operates in the pulse gating mode maintaining a low speed in compliance with a mechanical characteristic 61 (FIG. 8) within the first quadrant of mechanical characteristics. In the drawing the torque M of the motor 2 is plotted on the X-axis and the speed n of the motor 2 on the Y-axis.

A higher speed of the motor 2 (FIG. 2) may be set by closing one or two switches 16, thereby reducing the breakdown voltage of the voltage reference diodes 15 (operating threshold). In this case the motor 2 will operate in compliance with characteristics 62 or 63 (within the first quadrant of mechanical characteristics).

The device of FIG. 3 functions in much the same manner. However, its capabilities are increased due to the utilization of the switch 31 and the load setter 24 for the motor 2.

When the mechanism is lifting a load, the motor 2 operates in the pulse gating mode as described above. The output signal of the element 11 having an adjustable operating threshold is applied to the control electrode of the thyristor 33. As the thyristor 33 is activated and the voltage reference duode 34 is broken down, the control signal from the output 14 of the thyristor switch 5 is fed to the pulse distributor 3.

Figure 8:
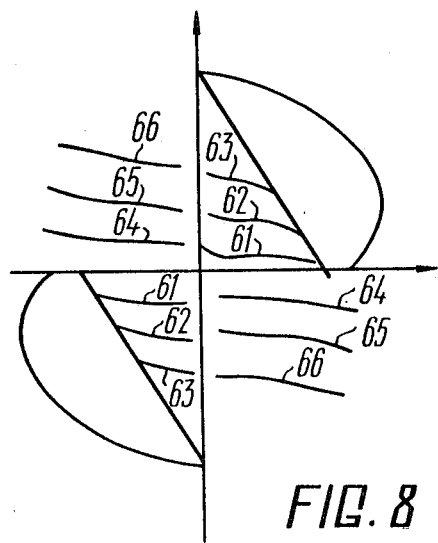
FIG. 8 depicts mechanical characteristics of the motor of the device of FIGS. 2 through 7.

When the mechanism is used to lower a small load, the motor 2 is reversed by the use of the switch 9 representing a reversible structure. The speed is controlled essentially in the same manner but within the third quadrant of mechanical characteristics (FIG. 8). In this case the connection of the coil 22 of the control unit 10 is checked by applying a signal from the output 27 of the transducer 24.

If the load being lowered is big, the signal comes from the output 29 of the load transducer 24, a condition causing disconnection for the switch 9 and connection of the switch 31 effecting dynamic braking. The three-phase semicontrollable bridge of the thyristor switch 5 is connected to the stator winding 8 of the motor 2. The motor 2 is transferred to selfexcitation dynamic braking to lower the load in compliance with mechanical characteristics 64, 65 and 66 within the fourth quadrant of mechanical characteristics.

The device of FIG. 4 is essentially similar to the device of FIG. 3 except that it additionally includes the power-supply voltage transducer 38, the relay element 39 and the comparison unit 40.

The preferred circuitry operates similarly to the circuit depicted in FIG. 3, the sole difference being that the element 11 with an adjustable threshold represents the comparison unit 40 assembled around the unijunction transistor 50, one base of which is connected to the input of the pulse shaper 12.

When the motor 2 is connected to the power supply, the signal proportional to the slippage of the motor 2 is fed to the potentiometer 53 and then through the resistor 52 to the emitter of the transistor 50, thereby causing the turn-on of the transistor and application of the control signal to the pulse shaper 12 at a predetermined value of slippage of the motor 2.

When the voltage fed from the power supply varies, the signal taken from the potentiometer 53 and coming to the emitter-base junction of the transistor 50 will change proportionally. This should result in a change of the slippage of the motor 2 to render the transistor 50 conductive. Stated differently, the speed of the motor 2 will change. However, the signal fed from the transducer 38 through the relay element 39 to the input of the comparison unit 40 will change in proportion simultaneously with the varying signal coming to the potentiometer 53. The signal fed from said transducer is applied to the other base of the transistor 50, thereby changing its operating threshold. So, the slippage of the motor 2 causing the operation of the transistor 50 and, in effect, the speed of the motor 2 will remain constant in the event of a variation of voltage fed from the power supply.

As the load of the motor 2 changes and it is transfered to dynamic deceleration conditions, the signal at the output 27 of the load setter 24 will be zero, a condition resulting in the turn-off of the switch 47 of the relay element 39 and disconnection of the comparison unit 40 from the power supply.

The pulse shaper 12 is connected to the comparison unit 40 through the switch 54 magnetically coupled to the coil 55 connected to the output of the OR gate 25. In the presence of a signal at the output of the OR gate 25 the switch 54 operates to connect the pulse shaper 12 to the comparison unit 40, thereby preparing the thyristor switch 5 for activation.

The device of FIG. 6 operates in the following manner.

Voltage from the power supply is fed to the stator winding 8 of the motor 2 and an e.m.f. is induced in the rotor winding 6. The e.m.f. causes the current to pass through the resistors 58, the divider 57 and the diodes 20 and 59. The voltage taken from the divider 57 is applied to the input 13 of the element 11 having an adjustable operating threshold. The occurring process will be as described below, when the following condition is satisfied:

$$k_1 \cdot k_2 \cdot E \cdot S > U_1^1 + U_2^1, \tag{2}$$

where
$k_1$ = rectification factor;
$k_2$ = voltage scaling ratio of the divider 57;
$E$ = e.m.f. of the stationary rotor;
$S$ = slippage of the motor 2;
$U_1^1$ = operating voltage of the element 11; and
$U_2^1$ = operating voltage of the pulse shaper 12.

The element 11 and the pulse shaper 12 operate and the signal from the divider 57 is fed to the pulse distributor 3 and then to the control electrode of the same thyristor 19 which has a positive anode voltage at the moment. The thyristor 19 turns on and the rotor current is short-circuited via the resistors 58 and 7, thereby producing torque of the motor 2. The rectified voltage of the rotor winding 6 also decreases when.

$$k_1 \cdot k_2 \cdot U_3 \cdot S < U_1 + U_2, \tag{3}$$

where $U_3$=voltage across the winding 6 of the stationary rotor, which is shorted to the resistors 58 and 7.

The element 11 turns off and no signal comes to the control electrode of the thyristor 19. However, the thyristor 19 conducts until its cathode potential remains negative with respect to the other thyristors 19. When the moment of activation of the next thyristor 19 comes, the preceding thyristor 19 turns off and the input voltage of the element 11 increases, a condition causing its operation and activation of the next thyristor 19. As the motor 2 picks up speed, the voltage across its rotor winding 6 decreases. At the instant the predetermined speed is attained, the condition (2) will not be satisfied, the element 11 will remain nonconductive and the rotor circuit of the motor 2 will not be closed through the resistor 7. Under the action of a static load the motor 2 begins to slow down and the voltage across the rotor winding 6 increases. As it reaches the value at which the condition (2) is satisfied, the thyristors 19 of the switch 5 will again turn on and the entire process will repeat.

Thus, in the preferred embodiment of the device activation of the thyristors 19 will not cause the measuring circuit to open. The measurement and signal generation during activation will take place at the instant the thyristors 19 turn on spontaneously.

The device of FIG. 7 operates in much the same manner as the device of FIG. 6, the only difference being that sum current of the rotor windings 6 of the motors 2 is short-circuited through the common resistor 7 placed at the output of the thyristor switch 5. The diodes 60 are used to isolate the rotor circuits of the motor 2.

The hereinproposed device for controlling the speed of an induction motor accomplishing the method in compliance with the invention boasts of simple design, high operational reliability and low cost, another advantage being the provision of a wide speed control range (1:20, min.) in all four quadrants of mechanical characteristics. The device depicted in FIGS. 2, 6 and 7 assures operation of the motor in the first and third quadrants of mechanical characteristics (FIG. 8). The device shown in FIGS. 3 and 4 provides operation of the motor in all four quadrants of mechanical characteristics (FIG. 8).

The description of the invention has been confined to the use of specific terms for clarity. However, it is not understood to be limited by the specific terms used, because each term is susceptible to modification to embrace all equivalent elements operating in a similar manner and employed for the solution of the same problems.

It will be made clear that this invention may be suitably modified by those skilled in the art to adapt it to different usages and conditions and, accordingly, it is desired to comprehend such modifications within this invention as may fall within the scope of the appended claims.

What is claimed is:

1. A device for controlling the speed of at least one induction motor having a stator winding and a rotor winding and comprising:
a power supply;
a switch having a first input, a second input and an output and connected via its first input to said power supply and via its output to said stator winding of said motor;
a first control unit having an input, and an output coupled to the second input of said switch;
at least one resistor electrically coupled to said rotor winding of said rotor;
a thyristor switch having an input, a control input, a first output coupled to said rotor winding of said motor, and a second input;
a pulse distributor having an input and an output and connected via its output to said control input of said thyristor switch;
a unit effecting sampled-data control of the speed of said rotor of said motor and comprising an element with an adjustable operating threshold having an input, a control input and an output and electrically coupled via its input to the output of said thyristor switch, and a pulse shaper connected to said output of said element and to the input of said pulse distributor;
a load setter for said motor having a first output and a second output and connected via its first output to said input of the first control unit;
an OR gate having a first input, a second input and an output and connected via its first input to the first output of said load setter for said motor, via its second output to the second output of said setter and via its output to said control input of said element having an adjustable operating threshold;
a switch effecting dynamic braking of said motor having a first input, a second input, a third input and an output and connected via its first and second inputs to the first and second outputs of said thyristor switch, respectively, and via its output to said stator winding of said motor; and
a second control unit having an input and an output and connected via its input to the second output of said load setter for said motor and coupled via its output to the third input of said switch effecting dynamic braking of said motor.

2. A device as claimed in claim 1 further comprising:
a voltage generator of said power supply having an input and an output and electrically coupled via its input to said power supply;
a relay element having a first input, a second input and an output and connected via its first input to the first output of said load setter for said motor and via its second input to said output of said voltage generator;
a comparison unit having a first input, a second input and an output and connected via its first input to said output of said relay element, electrically coupled via its second input to the first output and to the second output of said thyristor switch and connected via its output to said pulse shaper.

3. A device as claimed in claim 1 comprising:
a rectifier having an output and connected to said rotor winding of said motor;
a voltage divider having a first input, a second input and an output and connected via its first input to said output of said rectifier and via its second input to the second output of said thyristor switch and coupled via its output to said input of said element having an adjustable operating threshold.

4. A device as claimed in claim 2 comprising:
a rectifier having an output and connected to said rotor winding of said motor;
a voltage divider having a first input, a second input and an output and connected via its first input to said output of said rectifier and via its second input to the second output of said thyristor switch and connected via its output to said input of said element having an adjustable operating threshold.

* * * * *